(12) United States Patent
Huang

(10) Patent No.: US 8,037,602 B2
(45) Date of Patent: Oct. 18, 2011

(54) METHODS OF MAKING ENERGY EFFICIENT COOKWARE

(75) Inventor: Lee Lisheng Huang, Palo Alto, CA (US)

(73) Assignee: Eneron, Inc., Palo Alto, CA (US)

( * ) Notice: Subject to any disclaimer, the term of this patent is extended or adjusted under 35 U.S.C. 154(b) by 97 days.

(21) Appl. No.: 12/413,444

(22) Filed: Mar. 27, 2009

(65) Prior Publication Data

US 2010/0242282 A1     Sep. 30, 2010

(51) Int. Cl.
  *B21D 53/02*  (2006.01)
  *B65D 6/28*   (2006.01)
  *A47J 27/02*  (2006.01)
(52) U.S. Cl. .................. 29/890.03; 220/608; 126/390.1
(58) Field of Classification Search .............. 220/608; 126/390.1; 29/890.03
  See application file for complete search history.

(56) References Cited

U.S. PATENT DOCUMENTS

| | | | |
|---|---|---|---|
| 679,928 A * | 8/1901 | Warren | 126/390.1 |
| 857,115 A * | 6/1907 | Schonleber | 165/169 |
| 1,093,648 A | 4/1914 | Potter | |
| 1,201,138 A | 10/1916 | Bingham | |
| 1,392,848 A | 10/1921 | Allen | |
| 1,495,395 A | 5/1924 | Boehm | |
| 1,578,741 A | 3/1926 | Arthur et al. | |
| 2,085,220 A | 6/1937 | Howlett | |
| 2,198,647 A * | 4/1940 | Wolcott | 99/340 |
| 2,213,378 A | 9/1940 | Benesh | |
| 2,840,684 A | 6/1958 | Watkins | |
| 3,242,984 A | 3/1966 | Delpeyroux et al. | |
| 3,593,702 A * | 7/1971 | Zigomalas | 126/390.1 |
| 3,701,344 A | 10/1972 | Walls et al. | |
| D227,028 S | 5/1973 | Behm | |
| 3,842,726 A | 10/1974 | Fautz | |
| 4,552,284 A | 11/1985 | Rummelsburg | |
| 4,574,777 A | 3/1986 | Bohl et al. | |
| 4,622,948 A | 11/1986 | Oh | |

(Continued)

FOREIGN PATENT DOCUMENTS

DE     3339848 A1     5/1985

(Continued)

OTHER PUBLICATIONS

Machine Translation of JP-2002177134-A as presented by applicant on Nov. 22, 2010.*

(Continued)

*Primary Examiner* — David Bryant
*Assistant Examiner* — Jacob Cigna
(74) *Attorney, Agent, or Firm* — Perkins Coie LLP

(57) ABSTRACT

Techniques for designing and creating energy efficient cookware are provided. In accordance with the techniques cookware can include a cookware base having a cooking surface and heating surface. The heating surface can have a pattern of fins forming heat exchange channels. The fins can effectively increase surface area and the channels can guide thermal energy to the perimeter of the cookware base while the fins absorb the thermal energy. The channel fins can improve energy transfer while providing even distribution throughout the cooking surface. The use of fins can also improve the mechanical strength to the cookware. Methods of making the energy efficient cookware are provided. A piece of cookware with a thick base can be provided by casting and by bonding a metal plate to the cookware body. Within the base, heat exchange channels are created by manufacturing processes such as casting or cutting to improve heat transfer.

21 Claims, 10 Drawing Sheets

A gang blade cutting setup

U.S. PATENT DOCUMENTS

| | | | | |
|---|---|---|---|---|
| 4,926,843 | A * | 5/1990 | Vocke et al. | 126/390.1 |
| 5,357,850 | A * | 10/1994 | Coudurier | 99/422 |
| 5,396,834 | A * | 3/1995 | Gambini | 99/422 |
| 5,411,014 | A * | 5/1995 | Paul | 126/390.1 |
| 5,553,531 | A | 9/1996 | Brown | |
| 5,564,589 | A | 10/1996 | Fu et al. | |
| 5,711,290 | A * | 1/1998 | Kim | 126/390.1 |
| D392,840 | S * | 3/1998 | Rae | D7/402 |
| 5,964,145 | A | 10/1999 | Brown | |
| 6,114,028 | A | 9/2000 | Muchin et al. | |
| 6,263,787 | B1 | 7/2001 | Tseng et al. | |
| 6,298,775 | B1 | 10/2001 | Chen | |
| 6,374,821 | B1 | 4/2002 | Furuhashi | |
| D503,066 | S | 3/2005 | Militi | |
| 6,926,971 | B2 | 8/2005 | Groll | |
| D511,929 | S | 11/2005 | Coppi | |
| 7,150,279 | B2 | 12/2006 | Cheng et al. | |
| 2003/0198525 | A1 * | 10/2003 | Iwamoto et al. | 407/54 |
| 2006/0237166 | A1 * | 10/2006 | Otey et al. | 165/80.4 |
| 2007/0193575 | A1 * | 8/2007 | Jan | 126/390.1 |
| 2007/0199555 | A1 | 8/2007 | Gregory | |
| 2008/0029082 | A1 | 2/2008 | Dowst et al. | |
| 2008/0035139 | A1 * | 2/2008 | Marin | 126/390.1 |
| 2008/0223359 | A1 | 9/2008 | Huang | |

FOREIGN PATENT DOCUMENTS

| | | |
|---|---|---|
| EP | 0928639 A2 | 7/1999 |
| EP | 1878367 | 1/2008 |
| FR | 2493125 A1 | 5/1982 |
| JP | 57073328 A | 5/1982 |
| JP | 59212627 A | 12/1984 |
| JP | 61191814 A | 8/1986 |
| JP | 11206572 A | 8/1999 |
| JP | 11244135 A | 9/1999 |
| JP | 2002177134 | 6/2002 |
| JP | 2002177134 A * | 6/2002 |
| WO | WO-2004/000082 A2 | 12/2003 |
| WO | WO-2008076140 A2 | 6/2008 |

OTHER PUBLICATIONS

Co-pending U.S. Appl. No. 11/992,972, filed Mar. 31, 2008.
Co-pending U.S. Appl. No. 12/114,769, filed May 3, 2008.
Co-pending U.S. Appl. No. 12/246,459, filed Oct. 6, 2008.
Co-pending U.S. Appl. No. 12/246,457, filed Oct. 6, 2008.
Non-Final Office Action Mailed Jul. 22, 2010 in Co-pending U.S. Appl. No. 12/114,769, filed May 3, 2008.
International Search Report PCT/US2009/051980 dated Apr. 27, 2010 pp. 1-3.
International Search Report PCT/US2007/07276 dated Jul. 7, 2008 pp. 1-3.
International Search Report PCT/US2009/059579 dated May 10, 2010 pp. 1-3.
Written Opinion PCT/US2007/07276 dated Jul. 7, 2008 pp. 1-3.
Written Opinion PCT/US2009/059579 dated May 10, 2010 pp. 1-5.
Written Opinion PCT/US2009/051980 dated Apr. 27, 2010 pp. 1-4.
International Search Report PCT/US2010/021244 dated Sep. 15, 2010 pp. 1-3.
Written Opinion PCT/US2010/021244 dated Sep. 15, 2010 pp. 1-3.
English Machine translation of JP 2002177134.
Final Office Action Mailed Oct. 28, 2010 in Co-pending U.S. Appl. No. 12/114,769, filed May 3, 2008.
Non-Final Office Action Mailed Feb. 4, 2011 in Co-pending U.S. Appl. No. 12/246,459, filed Oct. 6, 2008.
Non-Final Office Action Mailed Jan. 24, 2011 in Co-pending U.S. Appl. No. 12/114,769, filed May 3, 2008.

* cited by examiner

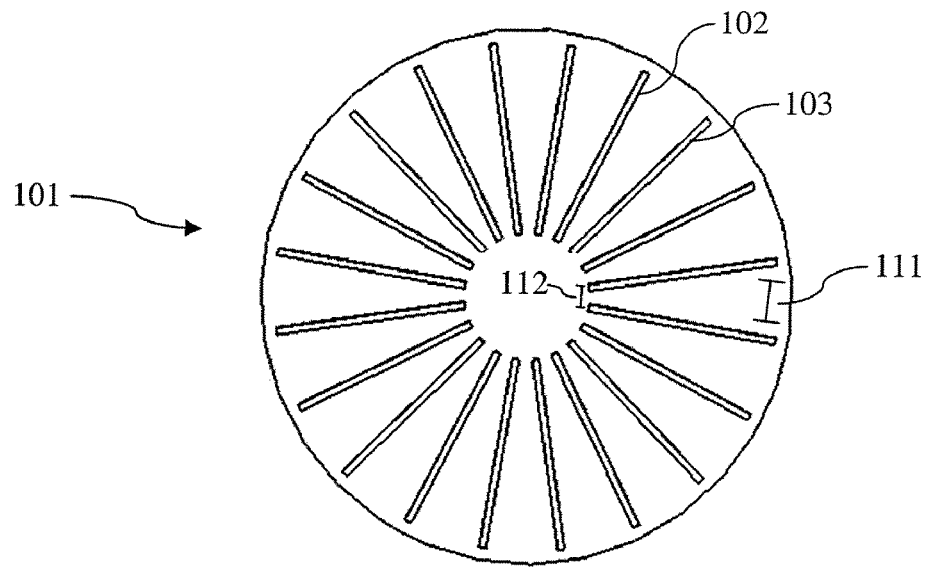
FIG. 1 A radial pattern of heat exchange channels
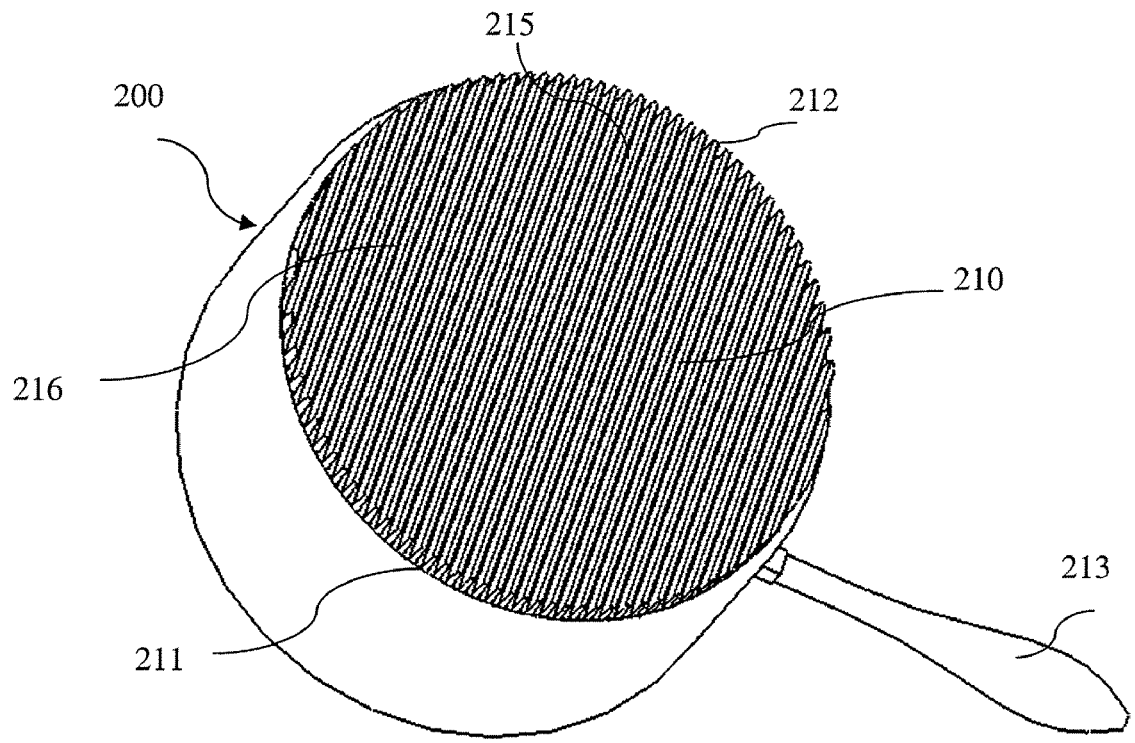
FIG. 2 A piece of cookware with linear pattern of channels

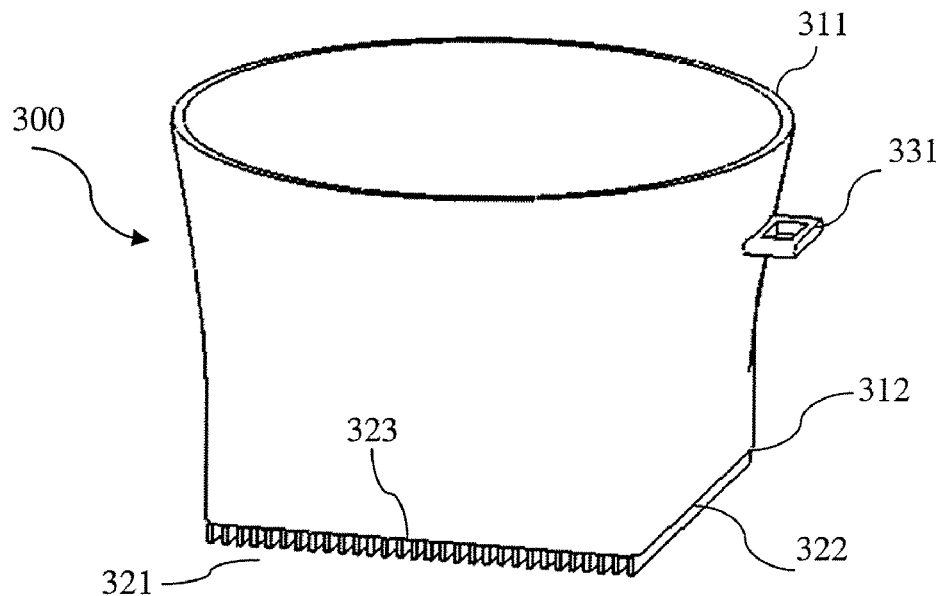
FIG. 3 A square based piece of cookware with linear pattern of channels
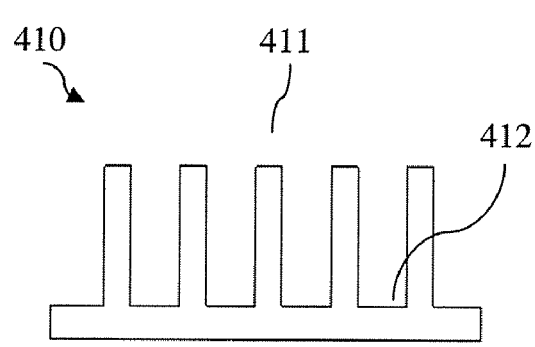
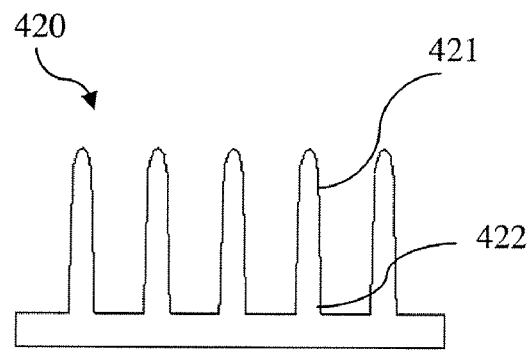
FIG. 4.1 Guide fins with flat top    FIG. 4.2 Guide fins with rounded

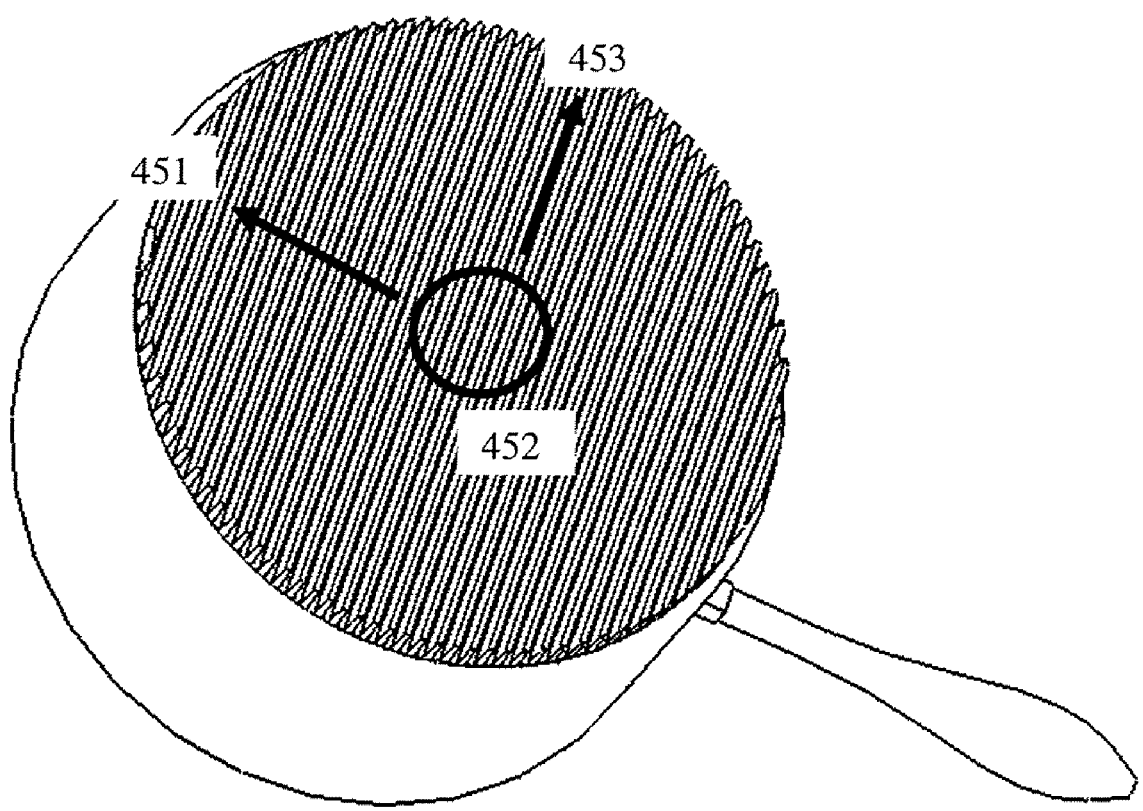
Fig 4.5 Central symmetric flame flow respect to channel direction

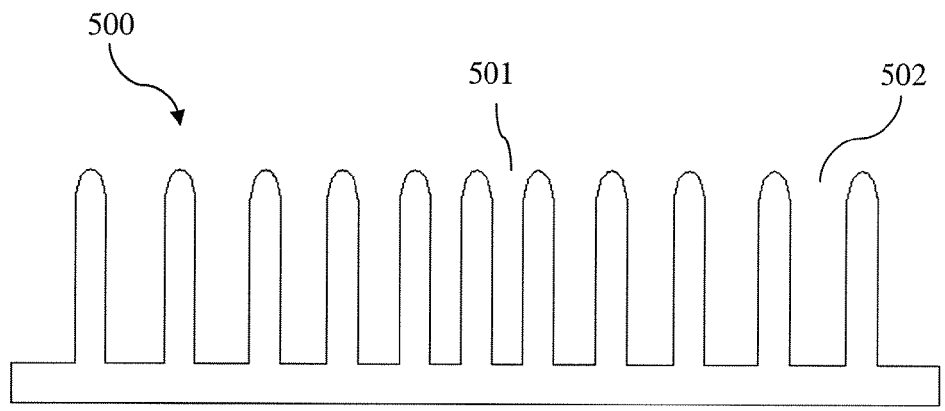
FIG. 5 Channel width varies across the base
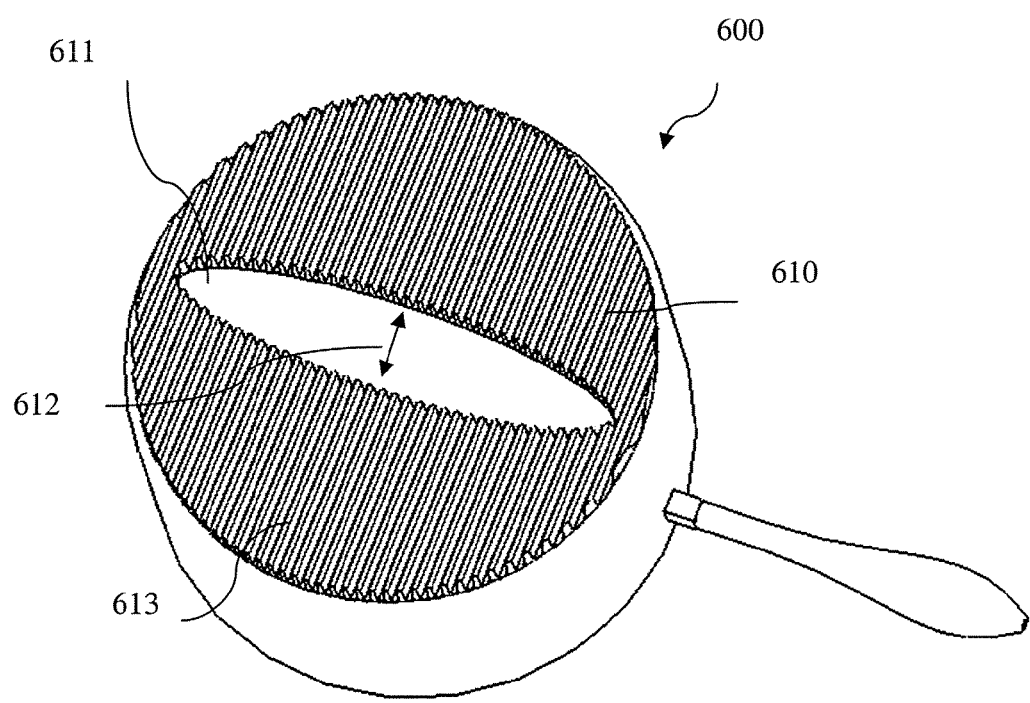
FIG. 6 A piece of cookware with a circular entrance opening in exchange channel pattern

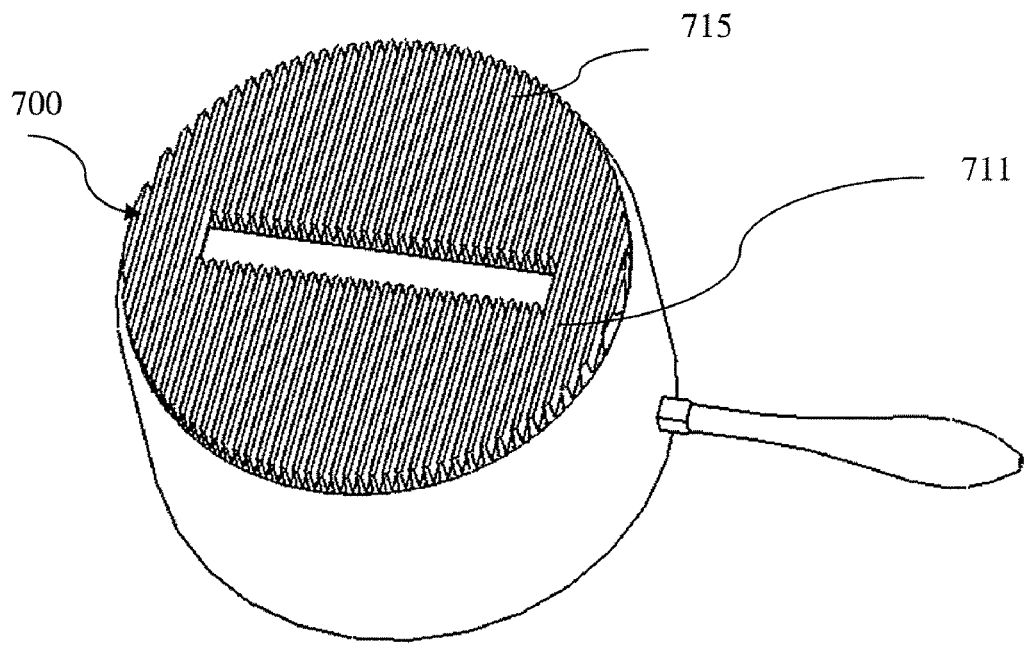
FIG. 7 A piece of cookware with a rectangular entrance opening in exchange channel pattern
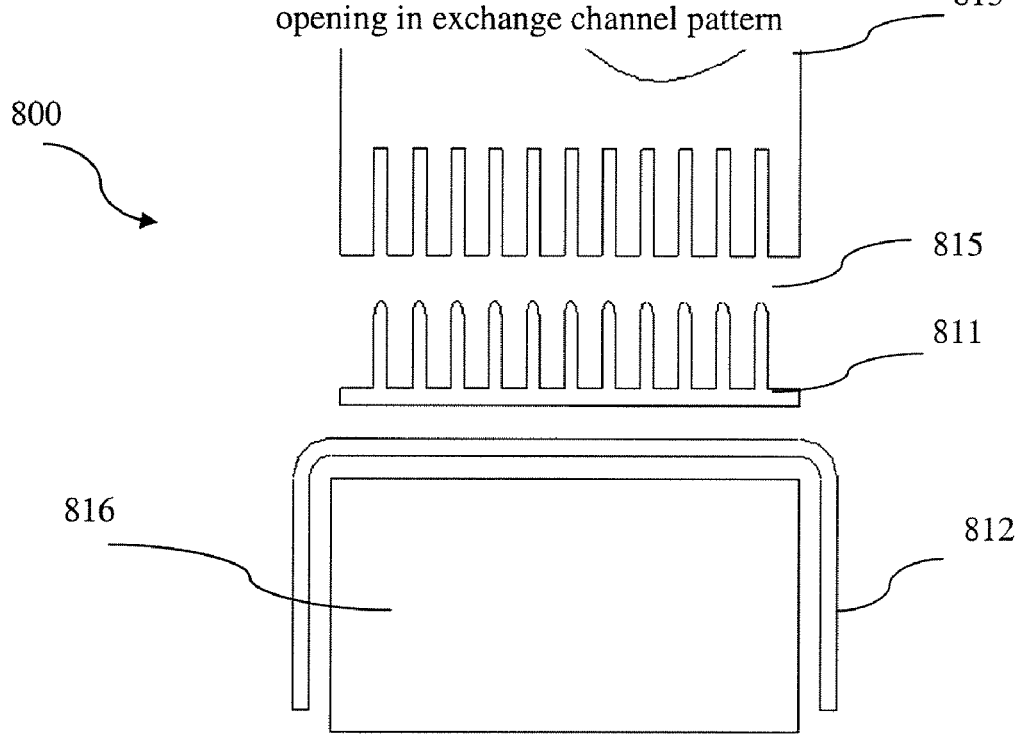
FIG. 8 A setup for rolling/impact bond process

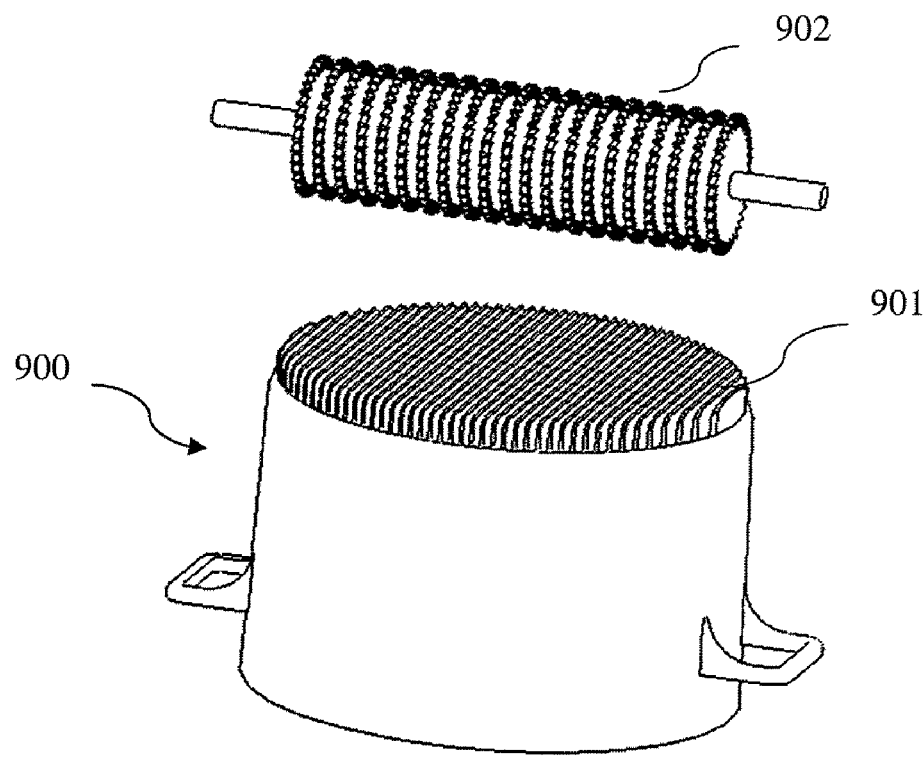
FIG. 9 A gang blade cutting setup
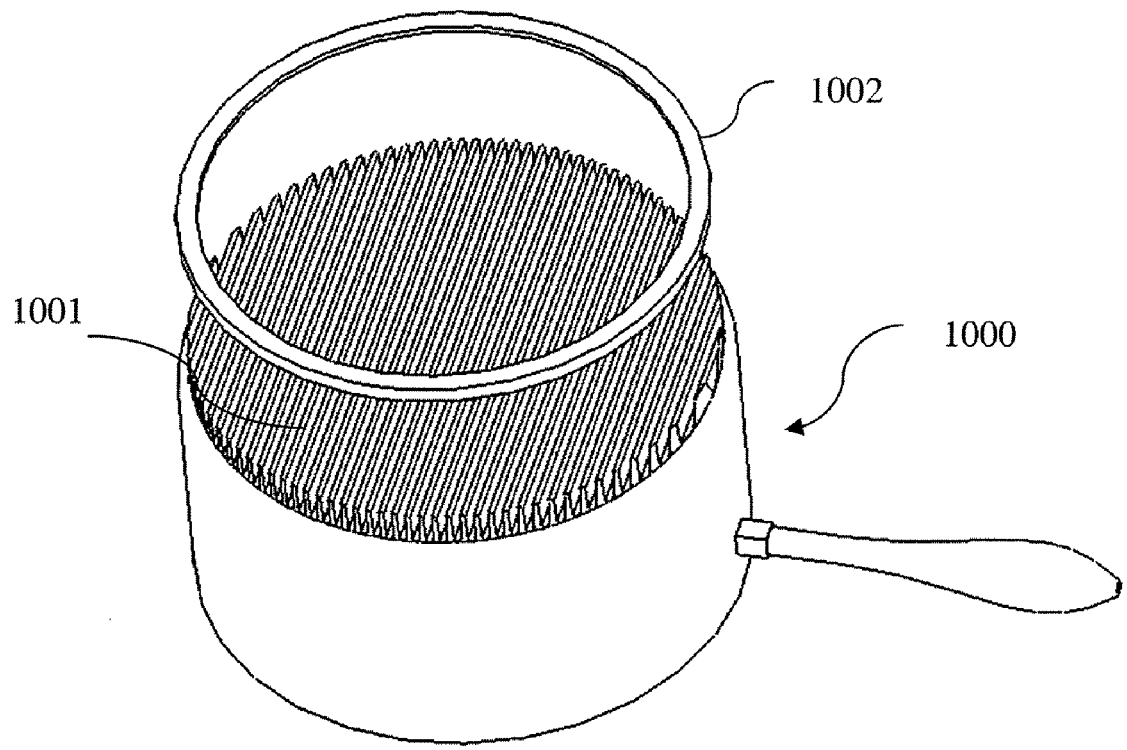
FIG. 10 A guard ring protecting fins

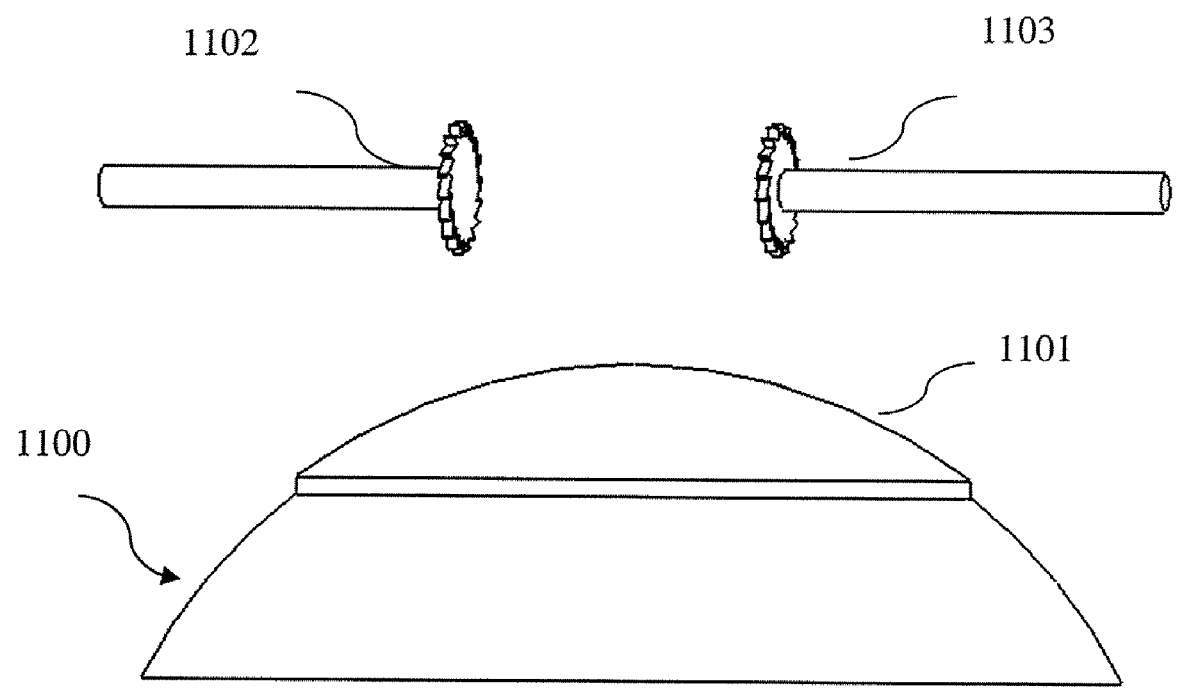
FIG. 11 Cutting channels on a wok with a thick base

METHODS OF MAKING ENERGY EFFICIENT COOKWARE

FIELD OF THE INVENTION

The following disclosure relates to the manufacture of energy efficient cookware. More particularly this paper discusses the manufacture of cookware that efficiently transfers thermal energy from a heating element to a cooking surface.

BACKGROUND

Cookware is used to hold and apply heat to food. Exemplary pieces of cookware include a stock pot, a wok, and a frying pan. Although each of these have different shapes, they each include two basic elements: one surface for receiving thermal energy from a heat source, a "heat-receiving surface" and one surface for applying the heat to food, a "cooking surface."

Thermal energy can be generated from many different sources. Examples include electric and gas ranges. A heat source can generate the thermal energy by, e.g., burning gas, or transferring electricity through a heating coil.

When cooking food, the piece of cookware transfers the thermal energy from the heat-source to a heat-receiving surface. The food in the cookware then absorbs the heat from the cooking surface, cooking the food.

Thermal energy transfer from combustion sources can be inefficient. For example, a gas range is reported to be only about 30% efficient. This means that a lot of energy is wasted when cooking. The inefficiency increases energy bills and produces unnecessary, undesirable $CO_2$ into the environment.

Prior efforts have been directed to increasing the efficiency of gas ranges. For example, others have optimized burners to efficiently mix of air and fuel to completely combust the fuel. However there has been limited effort to improve the efficiency of the heat-receiving surfaces of cookware.

The foregoing examples of the related art and limitations related therewith are intended to be illustrative and not exclusive. Other limitations of the related art will become apparent upon a reading of the specification and a study of the drawings.

SUMMARY OF THE INVENTION

The following examples and aspects thereof are described and illustrated in conjunction with systems, tools, and methods that are meant to be exemplary and illustrative, not limiting in scope. In various examples, one or more of the above-described problems have been reduced or eliminated, while other examples are directed to other improvements.

A piece of cookware typically has a cookware base and a cookware wall. The cookware wall typically extends vertically from the perimeter of the cookware base. In PCT patent application no. PCT/US07/07276, publication no. WO/2008/076140, the present inventor suggests incorporating flame guide channels into the cookware base to improve the cookware.

A flame guide channel or heat exchange channel is the space between a pair of guide fins or perturbation fins extending vertically from the cookware base. The fins have a flame entrance near a center region of the cookware base, and have a flame exit near the perimeter of the cookware base.

Creating a piece of energy efficient cookware can include manufacture of at least one pattern of channels on the cookware base of the piece of cookware. The perturbation fins can have a first perturbation end positioned away from the central region and a second perturbation end positioned towards the perimeter of the piece of cookware.

In operation, the flame guide channel accepts a flame from a burner and guides the flame through the channel towards the perimeter of the cookware base. While flowing through the channel, the perturbation fins generate lateral turbulence in the flame by interfering with an onset of laminar flow. The induced turbulence increases thermal energy transfer from the flame to the cookware base and fins while minimizing the portion of the flame mixed with the ambient air. Such induced turbulence promotes heat conduction from the flame heat through the cookware to food for more efficient cooking. Further, the minimization of the mixing of flame with the air reduces heat loss to the ambient air.

In addition to the perturbation feature in the channels in PCT patent application no. PCT/US07/07276 publication no. WO/2008/076140, the present inventor herein discusses a pattern of linear guiding channels. The pattern of linear guide channels can effectively increase the surface area of the cookware base of the piece of cookware. This effectively increased surface area maximizes heat absorption by the cookware base. The channel enhances the heating surface, improving thermal energy transfer and offering higher performance than the original plain cookware base.

A channel can have a channel width profile defined by the distance between fins, and the channel can be varied across the base of a cookware. This channel width profile can be set during manufacture of the piece of cookware to allow a flame to easily enter into channels for efficient thermal energy transfer. The channel width profile can be designed relative to the size of the flame offered by the range or heating source used for cooking.

For a wok, the base of the piece of cookware typically has a curved contour that is continuous with the wall of the wok. Therefore, the heat receiving surface and the wall are typically one and the same, however, for the purpose of manufacturing linear heat exchange channels, the center of the base can be defined as the center of the heat receiving surface of the piece of cookware. The linear channels can run across the contour of the base surface, arranged vertically, but not necessarily perpendicular to the contour of the base.

To further facilitate entry of the flame into the channel, the fins can be constructed so as to reduce entrance impedance. Two aspects of doing so include tapering the fins and rounding the tips of the fins. When tapered, the width of the fins can be thinner at their extent and thicker at the cookware base. Rounding the fins can reduce flow entrance impedance.

To further improve the flame flow into the channels, the cookware base of a piece of cookware can include a flame entrance opening in the channel pattern on the cookware base. Flame can fill the opening and flow out through the channels, heating the cookware base.

Additionally, heat exchange channels can be used to improve pressurized cookware, for example, a pressure cooker. The efficient heat exchange channels transfer a high percentage of thermal energy from the range into the cooking system. Additionally, the efficient pressure cooker prevents a high percentage of thermal energy from leaving the system, resulting in higher temperature and pressure that expedite the cooking of the food. The combination produces a very efficient piece of cookware for a gas range.

Methods are disclosed that can produce the cookware with a high density of heat exchange channels. The methods can be performed cost effectively by making use of inexpensive materials having good thermal conductivity.

Cookware can be made in stainless steel in accordance with a method disclosed herein. The method can produce stainless steel cookware with linear heat exchange channels formed on the cookware base.

Also disclosed herein is a metal plate that has heat exchange features. The metal plate can be implemented as the cookware base of a piece of cookware or attached to the cookware base of a piece of cookware. Use of the heat exchange features can improve the efficiency of the piece of cookware.

BRIEF DESCRIPTION OF THE FIGURES

Objectives and advantages disclosed herein will be understood by reading the following detailed description in conjunction with the drawing, in which:

FIG. 1 shows an example of a radial pattern of heat exchange channels on a cookware base.

FIG. 2 shows an exemplary unit of cookware with a linear pattern of heat exchange channels, in this case, a pot.

FIG. 3 shows an example of a piece of cookware having a square cookware base with a linear pattern of channels.

FIG. 4.1 shows an example of guide fins having flat tops.

FIG. 4.2 shows an example of guide fins having rounded tops.

FIG. 4.5 shows an example of the cookware base of a pot indicating impedance of flow of flame against the direction of fins, and ease of flame flow along the direction of fins.

FIG. 5 shows an example of a channel profile with a width that varies across the cookware base.

FIG. 6 shows an example of a unit of cookware with an elliptical flame entrance opening in the center region of the cookware base.

FIG. 7 shows an example of a unit of cookware having a rectangular flame entrance opening in the center region of a cookware base.

FIG. 8 shows an example of a setup for manufacturing guide fins using a rolling/impact bond process.

FIG. 9 shows an example of a setup for manufacturing guide fins using a gang blade cutting device.

FIG. 10 shows an example of finned cookware with a guard ring.

FIG. 11 shows an example of a setup for cutting the cookware base of a wok.

DETAILED DESCRIPTION

Figure 12:
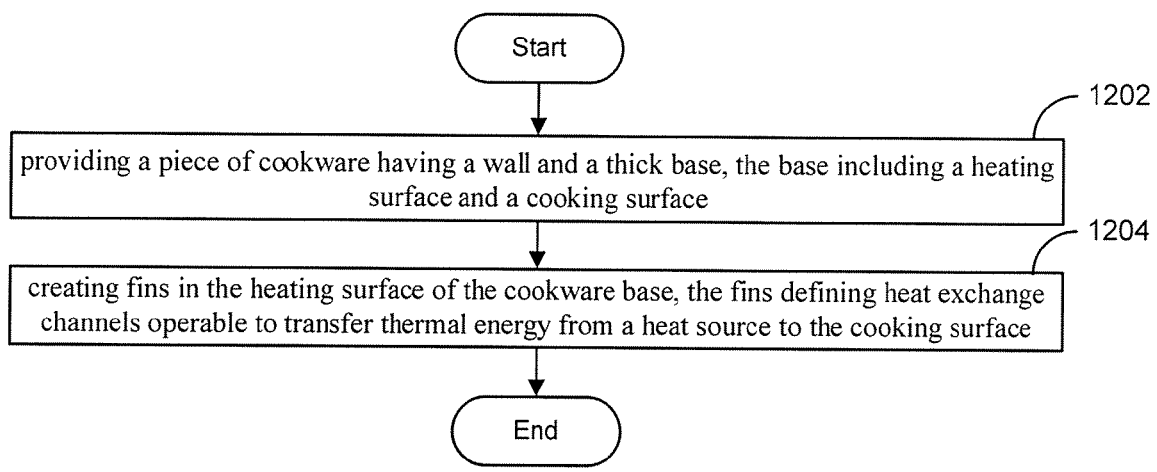
FIG. 12 shows an example of a flowchart of a method for making a piece of energy efficient cookware.

Although the following detailed description contains many specifics for the purpose of illustration, anyone of ordinary skill in the art will readily appreciate that many variations and alterations to the following exemplary details may be made. One skilled in the relevant art will recognize, however, that the concepts and techniques disclosed herein can be practiced without one or more of the specific details, or in combination with other components, etc. In other instances, well-known implementations or operations are not shown or described in detail to avoid obscuring aspects of various examples disclosed herein.

In a typical process for cooking food, a piece of cookware holding a medium, such as water, is placed on a gas range having a burner. When ignited, the burner produces a flame that rises up in response to pressure of the gas in the range's supply piping. The buoyancy of the hot air causes the flame to touch the cookware base of the cookware. Thermal energy is transferred from the flame to the cookware base via convection as well as thermal radiation. One side of the cookware base, the heat-receiving surface, absorbs the thermal energy. In the cookware base thermal conduction transfers this thermal energy to the cooking side of the cookware base. The cooking side of the cookware base then transfers thermal energy to the medium (e.g. water or food) via conduction and convection.

In the typical cooking process the most inefficient transfer of energy is the transfer of thermal energy from the flame to the cookware body. Generally convection is inefficient because convection is limited by a thick boundary layer inhibiting transfer of thermal energy from the flame to the cookware base.

The next most inefficient transfer is the heat transfer from the cookware to the medium. This transfer is also limited by a boundary layer; this layer inhibits transfer of thermal energy from the cookware body to the contents being cooked.

FIG. 1 shows an example of a radial pattern of heat exchange channels on a cookware base. Heat exchange channels can improve the efficiency of thermal energy transfer from the flame to the cookware base of a piece of cookware. FIG. 1 shows the bottom view of the piece of cookware 101 having a pattern of channels formed by fins protruding upward from the cookware base.

As used herein, a "flame guiding channel" is defined as the space bounded by a downward first fin, a downward second fin and a section of the cookware base between the downward first and second fins. The buoyancy of the hot flame works with the fins and the base to fill this well defined physical 3-D channel. For example, fin 102 and fin 103 collectively form a channel in the space between them on the base of the piece of cookware. In operation, flame fills the channel distributing thermal energy to the fins and base. The effect is analogous to that of an optical waveguide guiding light; such an optical waveguide can be formed on a graded index substrate by creating a ridge on the surface of the substrate.

A recognizable heat exchange effect is well pronounced where the ratio between the height of the fins and the distance between the fins is larger than one (approximately 1.0). Other ratios may generate a recognizable heat exchange effect as well.

In the radial pattern in FIG. 1, the channel width grows wider as the channel extends from a point near the center of the cookware base to the other end of the channel near the edge of the cookware base. For example, consider locations 111 and 112. As indicated in FIG. 1, the width of the channel at location 111 is larger than that in location 112.

As it regards manufacturing the fins to create the channels, each manufacturing method may have a limit on the dimensions the method can create. The lower limit on the dimensions of the process will govern the gaps between fins. This limit can determine the smallest channel width that can be achieved. If a surface area enhancement for the exchange channels calls for a width smaller than the lower limit of the manufacturing process then the process may not be able to produce the desired channels.

An increase in the channel width may be undesirable. Where the channel width is increased, the number of fins decreases because more space is allotted between fins. Fewer fins may mean less thermal energy is absorbed and transferred because fins expand the effective surface area of the cookware base. Therefore, it can be preferable to keep the channel width at a minimum dimension allowed by the manufacturing process to increase the number of fins on the cookware base.

For the reasons discussed above, a radial pattern with varying widths may not be the most efficient pattern of laying out fins. When viewing FIG. 1, consider that a manufacturing process limited by the width at 112 is not limited by the much wider width at point 111. This difference makes it difficult to utilize the maximum surface area for fins because of the lower limit on the space between fins required by the manufacturing process.

Contrarily, a linear pattern can use a constant width. It is possible to construct or define channels across the whole cookware base of the piece of cookware using the smallest dimension a given manufacturing process can produce. Therefore, a manufacturing process using a linear pattern can improve more surface area than a process using the radial pattern.

Additionally, a linear pattern of other fin structures can also be used. One method would be to create S shaped fins or "S fins." S fins offer one extra parameter to control the flow that linear fins do not: the S fins force to flow to change directions. The forced turning of the flow can slow the flow, trapping thermal energy for absorption into the base and fins. One exemplary method of manufacturing S fins is die-casting; other methods may be used as well.

FIG. 2 shows an exemplary unit of cookware with a linear pattern of straight heat exchange channels, in this case, a pot. The piece of cookware 200 includes a linear pattern of channels 210. The channel width is constant along the length of the channels. In typical use, a flame from a burner will expand near the center of the cookware base. Once the flame enters the channels, the channels will guide the flame towards the perimeter of the cookware base of the piece of cookware. Eventually the flame exits the channels at the perimeter, including points 211 and 212. As the flame flows along the channels the cookware base and fins absorb thermal energy.

Overall thermal energy transfer from the flame to the food inside the cookware can be limited by the amount of thermal energy transferred from the flame to the cookware base. Use of material with a low thermal conductivity coefficient may decrease performance by impeding thermal energy transfer. Therefore, in manufacturing the fins and cookware base, it can be advantageous to use a material having a high thermal conductivity coefficient.

Also seen in FIG. 2, is a handle 213. The handle 213 extends from the cookware wall at locations away from the output of the channels because the channels can otherwise transfer thermal energy to the handle. In this example the handle is perpendicular to the directions of the channels. Advantageously, the handle will not be heated by flames escaping from the channels. This can reduce the risk of injury.

Advantageously, there is a substantial improvement in energy efficiency when using cookware having a linear channel pattern. For example, consider a piece of aluminum cookware having an 8 inch diameter with guide fins having a width of 0.08 inches, and a gap of 0.15 inches and a height of 0.5 inches. This exemplary piece reduced cooking time by about 50% as compared with a similarly sized conventional piece of cookware. The conventional piece of cookware did not have exchange channels. Therefore, the decrease in cooking time of the improved cookware significantly improves energy utilization in cooking over a gas range.

Another example follows. In this example, it is determined that the use of cookware having a square cookware base can be about 10% more efficient than cookware with a round cookware base. Compare a piece of cookware having an 8 inch square cookware base with a piece of cookware having an 8 inch diameter round cookware base. The square cookware base has longer channels than that of the round cookware base because the channels on the round cookware base are shorter at the extent of the circle. The channel design in both cases is the same: width of the channel is 0.15 inch, the fin width is 0.08 inch and the height is 0.5 inch. The difference in efficiency can be explained by the manner in which the channels control the flame. The extra channel length at the corner of the square based cookware confines the flame for heat exchange longer than the round cookware base. Since the heat exchange happens inside the exchange channel, the extra channel length at the corners is what makes the difference. This effect can be significant on a range having a high fuel speed; there the complete combustion of the fuel may happen at a distance from the exit of the burner. Therefore, it is clear that a square based piece of cookware is more efficient than a round based piece of cookware, although heat exchange channels can be used to improve a round cookware base as well.

However, appearances can influence purchasing decisions. One may desire a round piece of cookware rather than a square piece of cookware. Therefore, in order to keep the energy efficiency it may be possible to provide a square based piece of cookware with the appearance of a round piece of cookware. To make a square based piece of cookware with a normal round cookware look, a design of the square cookware base cookware can have a round top opening. One such example follows.

FIG. 3 depicts an exemplary piece of cookware 300. The piece of cookware 300 has a cookware wall that is circular at the top 311, but squared at the bottom 312. This piece of cookware can be manufactured by any known or convenient process, for example, a standard progressive deep draw manufacturing process. Note that the exchange channels 321 are manufactured in parallel to the edge 322 of the square cookware base. This use of parallel channels will give extra channel space in the corners of the cookware base to transfer thermal energy, as discussed above. A handle 331 is attached on the cookware wall in area above the edge 322. Note that the handle is located away from the exits of the heat exchange channels at edge 323. Therefore hot flame is guided to the edge 323 away from edge 322, and the handle 331 is less likely to be heated by the flame. This can reduce the risk of injury.

To efficiently transfer thermal energy, hot flame should be allowed to flow freely into heat exchange channels. Impedance should be reduced wherever possible. However, this requirement needs to be balanced with a desire to enhance the surface area of the cookware base of a piece of cookware with as many fins as possible. To enhance a large surface area, it can be desirable to have dense fins. Dense fins are often thinner fins and also have narrower channel widths. However if the width of the channel is too narrow, the density can impede hot flames from entering the channels. The impedance $\Omega_e$ is defined as the ratio between the thickness of the fin at the entrance $\omega_f$ and the width of the channels $\omega_c$ ($\Omega_e = \omega_f / \omega_c$). To reduce the flame entrance impedance, $\Omega_e$, the thickness of the fins should be small. However, when the fin is too thin the fin will be more easily damaged during daily use. This may require the heat transfer efficiency to be comprised retain the strength of the fins.

However, one way to reduce the impedance without decreasing the thickness of the fins is to sharpen the top of the fins by rounding and/or tapering. FIG. 4.1 shows an example of guide fins having flat tops. In FIG. 4.1 the fin structure 410 includes fin width 411 and channel width 412. Fin structure 410 has a flat fin top. The impedance of the air can be represented by the ratio of fin width 411 to channel width 412. FIG. 4.2 shows an example fin structure 420 having fins with rounded tops. The tops of the fins are smaller making the effective width of the fin smaller thereby reducing the impedance of hot flame into the channels. FIG. 4 also depicts the fins as tapered, having a top end 421 than the cookware base end 422. This rounding and tapering can reduce the impedance $\Omega_e$ thereby improving the thermal energy transfer efficiency.

In addition to the impedance, the direction of the flame flow with respect to the direction of the channels also affects the ability of a flame to enter channels. A typical burner generates a symmetric central flame flow. As the flame flows upward due to buoyancy into the channels, it also flows outward in a radial direction. For the piece of cookware shown in FIG. 4.5, as the flame spreads outwards from 452, the direction of the outward flow velocity in region 453 is generally in the direction of the channels. Therefore it appears that the channel density can be increased in region 453. However, in region of 451, the flow velocity has a large component in perpendicular to the direction of the channels. One way to improve the flow near region 451 is to vary the channel width to allow the flame to flow more easily into the channels perpendicular to the direction of flame flow. In accordance with this, channels in region 451 can be spaced more distantly than in region 453.

The flame flow entrance impedance $\Omega_e$ plays an important role in the efficiency of cookware. Consider the following experiment on a piece of cookware with guide fins having a width of 0.08 inches, a gap of 0.1 inches and height of 0.5 inches. As compared with the previous example of guide fins width of 0.08 inch, gap of 0.15 inch and height of 0.5 inch, this channel fin density is higher. Therefore efficiency was expected to be higher because of the higher surface area. However the efficiency dropped by 10% from the design described above, resulting in 50% overall efficiency. This is because entrance impedance $\Omega_e$ is 0.8 in this example, as compared with the previous example, which had an $\Omega_e$ of 0.53. The higher flow entrance impedance makes the efficiency lower even though the effective surface area is larger.

However, one way of improving the efficiency other than changing the channel width is cutting slots across the channels to provide a path parallel to the direction of the flame. This slot helps the flame to enter the channels. In application to the previous example, cutting 3 slots of 0.25 inch across the channels in the center region to facilitate the entrance of the flame brought back 5% of the efficiency. This illustrates the importance of reducing the flame entrance impedance to facilitate efficient heat exchange.

An entrance opening is another way to facilitate entry of the flame into the channels. An entrance opening is an area of the cookware base where the height of the fins is zero or is substantially lower than the height of the other fins. For example a manufacturing process could create a circular area in the center of a cookware base without fins. The size of the area can match the size of a flame from a burner. In operation, the flame will exit a burner, rise up due to buoyancy into the entrance opening and be bounded by the cookware base inside the entrance opening. The hot flame is then forced into the channels, and escapes from the perimeter of the cookware base. This use of an entrance opening allows flames to completely enter into the channels thereby improving efficiency. Typically burner flame patterns are circular or shaped like a donut, however, a circle, an elongated circle, an ellipse, or a similar shape can be suitable.

For example, FIG. 6 shows an example of a unit of cookware with an elliptical flame entrance opening in the center region of a cookware base. In this case, the piece of cookware is a pot. The piece of cookware 600 has exchange channel pattern 610, and there is an elliptical entrance opening 611 in the center region of the cookware base of the piece of cookware 600. This elliptical opening can be matched with the conventional range flame pattern to facilitate the entry of flames into channels. The short axis 612 of the elliptical shape is in the direction of the channels 610. As a positive aspect of the flame entrance opening, hot flame entering the opening is forced out through mostly all of the channels. However, a negative aspect of the opening is that the length of the channels in region 613 is somewhat reduced.

To preserve the length of the linear channels for effective heat exchange, a rectangular entrance opening can also be used. A rectangular entrance opening can be made in the center region of the channel pattern, which will be oriented such that the longer side of the rectangle is perpendicular to the direction of the channels. This rectangular flame entrance opening in the channel fins can allow the flame to flow into the channels efficiently.

FIG. 7 shows an example of a unit of cookware having a rectangular flame entrance opening in the center region of the cookware base of the unit of cookware. The pattern of heat exchange channels is linear, and there is an area 711 in the center region without fins. In area 711, the flame flow is directed to enter channels and then flow away from the cookware base through the channels, including area 715. This pattern is well suited to cookware with a square cookware base.

A pressure cooker is an efficient cooking device. The pressure cooker can utilize high pressure to help expedite the cooking of food. High pressure can increase the boiling point of water thereby increasing the temperature that food is cooked at in the medium. Food cooks more rapidly at higher temperatures. Therefore, the pressure cooker is an efficient cooking device. However, high pressure does not improve the rate of increase of temperature in the medium, and high pressure can delay the boiling of the water, for example where a lid is sealed on a pot when at the beginning to heat the pot.

One way of making a pressure cooker more efficient is to add heat exchange channels to the cookware base of the pressure cooker. Heat-exchange channels can further improve the performance of the pressure cooker by improving the absorption of the energy from the flame into the pressure cooker. The transfer of more thermal energy into the pressure cooker will increase the rate of heating of the medium. This will not only reduce time required to raise the temperature and pressure, but also reduce the amount of the fuel burned to maintain the designed cooking pressure or temperature. This combination of heat exchange feature and the pressurized cooking can be an ultimate gas cooking energy saving solution.

In order to achieve the benefits of the energy efficient cookware in a market place, it is important to manufacture the heat exchange channels cost effectively with an energy efficient manufacturing process.

U.S. patent application Ser. No. 12/246,457 discloses many manufacturing processes. Different processes have their advantages and disadvantages. For example, extrusion is one way to manufacture efficient heat exchange channels using aluminum. However, stainless steel cookware may be more desirable than aluminum cookware.

To effectively gain the benefits of both the aluminum and the stainless steel, an extruded aluminum plate can be attached to the cookware base of a piece of stainless steel cookware. The extruded plate can be cut into the shape of the bonding surface, i.e. the plain face of the extruded plate can be wheel ground, or abraded to remove a surface oxide layer, if present. The cookware base of the stainless cookware can also be roughened and cleaned. Bonding can be performed by a rolling press.

FIG. 8 shows an example of a setup for manufacturing guide fins using a rolling/impact bond process. Where an extruded plate 811 is heated up to a temperature at or near 400° C., a piece of stainless steel cookware 812 can be heated to a temperature at or near 550 C. Other temperatures may be used as well, where effective to bond the metals.

An aluminum heat sink 816 can then be placed on the cookware base of the stainless cookware. A steel roller 815 can roll and press the aluminum plate 811 against the stainless steel cookware 812 which is placed on the stage 816 so that the aluminum plate 811 can be bonded to the stainless steel cookware 812. The roller 815 can be specially shaped, i.e. having a ridge pattern complimentary to the channel profile of the extruded aluminum plate.

The roller 815 can exert force via the ridges through the gaps between the fins of the aluminum plate 811 onto the stainless steel cookware 812 when rolling over the aluminum plate 811. If the channels have a width profile covering the plate 811 then the roller 815 can use a width profile that complements the channels.

Alternatively the heat sink can be pressed onto the bottom of the stainless steel cookware by a high pressure impact bond. The process can also be represented by FIG. 8, substituting a press die 815 for the roller 815. The press die would not roll over the aluminum plate 811, but rather would press down on whole cookware base at a same time. The die can have linear ridges to provide a pattern complementary to the channel structure on the aluminum plate 811.

Alternatively, another method bonds a thick aluminum plate to a piece of stainless steel cookware and then creates the channels inside the thick aluminum cookware base. Standing alone, stainless steel is not a very good thermal conductor and can provide uneven heat when cooking. To improve stainless steel cookware, the thick aluminum plate is bonded to the cookware base of the stainless steel. One standard method for bonding is impact bond is to attach a ¼" aluminum plate to the cookware base to improve the heating uniformity by spreading the thermal energy laterally. In the impact bonding process the cookware and the aluminum plate are heated by induction up to temperature about 400 C, and are placed in an impact bonding machine that will exert large pressure around 5000 psi through a mold to press the two metals together.

Other bonding methods can be used, for example, blazing. However, any known or convenient method can be used.

To manufacture exchange channels at least ⅛" in depth in the aluminum plate, it can be desirable to extend the process to aluminum thicker than ¼" inch. The following may support extending the depth: extending the capacity of the impact machine, changing the impact bond mold, and increasing the power of the induction heater.

To manufacture channels in aluminum thicker than ¼" inch, the aluminum plate can be cut to the size and shape of the bottom of the stainless cookware. This can be done before the impact bond. The cutting can be performed by, for example, a punch cutter although this method may be limited by the upper bound on the thickness the punch cutter can handle. This can also be performed by water jet cutting, plasma cutting and other metal cutting methods. Various methods may be more or less effective when used with various hard tempered alloys, such as a hard tempered aluminum alloy.

In some situations it may be preferable to combine two standard, thinner (¼") plates, separately cut, to make up one thick plate. This can be more cost effective than upgrading equipment to handle thick plates and may have other advantages as well. For example, a composite plate can be manufactured out of one pure aluminum plate bonded to one stainless plate. The top piece could be a hard aluminum alloy, which will be more robust during use. It is also preferable to use different materials to form a thick composite plate, for example an aluminum plate and a stainless steel plate can be used together as the harder stainless steel plate could act as a protection layer for the softer aluminum. Consider a compound material of approximately 0.6" thick aluminum plus approximately 0.025" thick of stainless steel. The majority of the material is aluminum for good thermal conductivity, but the stainless steel provides a protection layer; the stainless steel can be characterized as a "thin skin" protecting the aluminum. Also, for even better thermal conductivity, a copper plate can be used in place of the thick aluminum plate.

Heat exchange channels can be machined into a thick cookware base. This can be done by end milling the cookware base using a milling machine. However this process takes a long time and can be cost prohibitive. On the other hand, use of a cutting wheel can be fast, as seen when using a circular cutting saw or other metal saws.

Many different types of cutting wheels have been designed for efficiently cutting metal.

For example, consider a circular metal cutting blade, a band saw, an array of saws, or a multi blade cutter, such as a two blade cutter, or one with a higher number of cutters, such as a gang blade.

The efficient cutting wheel generally does not provide the flexibility of an end milling machining process to create different complex geometries, and is therefore not a tool of choice in typical CNC (computer numerical controlled) machine applications.

However, the linear characteristics of the channel design in this cookware make it possible to use cutting methods such as a circular metal cutting blade or a band saw to realize the channels in a metal plate such as an aluminum metal plate. Another good system would be an array of saws that can cut can cut all of the channels at the same time.

In a non-limiting example, consider a carbide-toothed aluminum cutting blade running at 6000 rpm. The feed rate can be set to 100 inch/min to cut aluminum at a depth of 0.5 inch. The width of the blade can be set to the width of the channel, for example 0.156". Using this setup, a pot of 10" inch diameter can be processed in less than 2 minutes. When a gang blade is used, the cutting time can even be shorter; and a two blade cutter can get the job done in less than a minute.

FIG. 9 shows an example of a setup for manufacturing guide fins using a gang blade cutting device. In FIG. 9 the cookware base of the pot 900 is cut by gang blade 901. The thickness of the blade can be the width of the channel, for example 0.15 inch. The blades can be spaced an equal distance apart, if equally spaced channels are desired. Where equally spaced channels are desired and where the number of channels is a multiple of the number of blades, the space between blades can be a multiple of the combined width of a channel and a fin. Then the gang blade can cut the entire cookware base of the piece of cookware in a few passes, where the blade is offset by the width of a channel at each pass.

In a non-limiting example, consider the blade pitch in the gang 901 to be twice the pitch of the channels, e.g. 0.46 inch. There, the blade will cut the entire cookware base in two runs.

To complete the second run, the gang blade can be offset from the first run by the pitch of the channels e.g. 0.23 inches to perform the second cut.

Alternatively, where non-equally spaced fins are desired, the width of the blades can vary along the gang-blade axis. When run, the gang-blade will produce non-equally spaced fins. Advantageously, when cutting more disparately spaced fins, the blade can still complete the entire cutting process in a single run.

Alternatively, single blades or a small number of gang blades can be used. The operation can be done on a CNC (computer numerical controlled) milling machine, preferably a horizontal milling machine. A vertical machine can also work when used with different fixtures. For a gang-blade having a high number of blades, a universal milling machine that has a spindle anchored at both ends can be used to secure the gang blade. The spinning speed, and single path cutting depth, and the feed rate can be optimized for productivity.

Another option is the use of a custom machine, or machines to use a conveyer system to maintain a continuous production line. Different machines along the line can perform cutting at different depths, at different lateral positions, cutting different metals and different finish steps.

When cutting a thick composite metal cookware base, different cutting blades may be required to achieve an optimal production yield. For cookware with a thick composite cookware base having a stainless steel protection layer it may be desirable to use two blades. A first blade with a tooth profile that has been optimized for cutting steel can skim off the stainless steel layer (the "thin skin"). Then a second blade with a tooth profile tailored to cutting aluminum can quickly run through the thick aluminum. The remaining product will include a layer of the stainless steel covering the aluminum fins, but exposing the aluminum channels. The width of the blade cutting the stainless steel can be slightly wider than the blade that cuts the aluminum so that the stainless opening is sufficiently large enough to allow the aluminum cutting blade to enter with no obstruction. It is also possible to design the width of the cutting blade to be tapered such that the cookware wall of resulting fins can be thinner at the tips. This will allow the flame to enter the channels with low impedance as described above.

Alternatively, a band saw can be used for cutting the channels. A band saw typically runs at a much lower speed than the gang blade however, the band saw can be slowly pressed down to an accurate depth into an aluminum plate while the saw is running.

Aluminum distributes thermal energy well. Typically aluminum is bonded to the cookware base of a stainless steel pot to help distribute heat evenly. If a pot was made out of aluminum, thermal energy might be evenly distributed. However, creating a channel structure in a piece of thick based aluminum cookware can improve energy efficiency.

A piece of thick based aluminum cookware can be reformed by impact bonding an aluminum plate to a standard piece of aluminum cookware. The process is similar to that for bonding an aluminum plate to stainless steel. Since aluminum has better thermal conductivity than stainless steel, heating the cookware wall for bonding purposes can take longer. However, bonding aluminum to aluminum can require a lower temperature than that of aluminum to stainless steel because of the differences of those materials. It may also be possible to bond the materials without substantially heating the piece of cookware as much as the aluminum plate. This combination of decreasing temperature and decreasing total material to heat can reduce the process time, making it more economical. The bonding strength between the aluminum plates should be higher than the bond between the two different metals.

A typical piece of premium aluminum cookware has thicker cookware walls than an economical piece because the cost of material. A thicker cookware wall can also mean a thicker cookware base where the aluminum cookware is produced by deep drawing or spinning. Thicker material can yield more uniform heating, and will be less likely to warp during use. However, a thick cookware wall may not provide premium efficiency as compared with a thin cookware wall if the cookware base is just as thick. It may be more effective then to attach a thick cookware base to the thin cookware wall in order to achieve uniform heating.

Another way to create a thick based piece of aluminum cookware is casting. Cast aluminum cookware is routinely made using an inexpensive casting process such as a gravity cast. Additional costs may be minimal in using this method to cast a piece of thick based aluminum cookware. The cost of a mold used to make a thick based piece of cookware can be significantly lower cost than that creates fins as well. Similarly, a process for casting aluminum fins can be challenging for larger sized pieces of cookware.

Given a thick based piece of aluminum cookware, machining can be performed to create the heat exchange channels in the thick cookware base.

These same processes can be readily applied to manufacture thick based cast iron cookware.

When cooking with a piece of cookware having channels, the fins may catch on the grate of a range top. Therefore, to facilitate the movement of the cookware on the grate, a guard ring can be added to the edge of the cookware base. The ring can be formed by a plain metal strip or from a right angled metal strip.

In FIG. 10 shows an example of finned cookware and a guard ring. Cookware 1000 has heat channels 1001 built into the cookware base. A guard ring 1002 made of, e.g., stainless steel or aluminum alloy, and can be attached to the fins by a set of screws or permanent. It is also possible to cut a recess on the edge of the cookware base so that the guard ring can be flush with the top of the fins.

A wok is notoriously in-efficient having energy efficiency of about 10%. It is hard to improve the efficiency of the wok. However, an approach similar to those discussed above can be used to create fins on a wok. For example, a specially adapted fixture can be used to tool the contour of the cookware base of the wok for an impact bond. An aluminum plate can be deformed to the contour of the wok, and then placed on the cookware base of either a stainless steel wok or a plain steel wok. The assembly can then be heated using a special contoured induction heater. Once the temperature is sufficiently high, the assembly can be placed into an impact bonding machine, and the impact bond can be performed to attach a metal plate onto the wok. The die and the mould in the impact bond machine also need to be contoured. The metal can be, e.g. aluminum or copper. It may be possible not to contour the aluminum plate before impact bonding, such as by heating the plate with a standard induction heater. There the metal plate can be conformed to the contour of the wok in the impact bond process. This can be done by using contoured tooling to press the metal plate to the wok contour.

FIG. 11 shows an example of a setup for cutting the cookware base of a wok. The metal plate 1001 can be bonded to steel wok 1100. A trench can then be created by a CNC (computer numerical controlled) machine with a circular saw. The CNC can be programmed to trace the contour of the wok to create the heat exchange channels on the cookware base. A track may be used to follow the contour while cutting. It may not be easy to cut the whole surface from one side. In operation, the cutting can be done in halves, first cutting one half, then rotating the wok and cutting the other half. In this case, the channel can be made in the direction of the blade. However the depth may follow the curvature of the wok.

Alternatively, two blades could be used to cut different halves of the wok at the same time.

As seen in FIG. 11, the wok 1100 can be placed upside down and cut by cutting blade 1102, and/or cutting blade 1103. As depicted, blade 1102 can be used by itself to cut channels in the left side of the wok. The wok 1100 can then be rotated 180 degrees so that the cutting blade can cut the right side of the wok. Alternatively the blade 1102 can be used to cut the left side and blade 1103 can be used to cut the right side.

Regarding a wok, a cast aluminum wok with a thick base can be easily manufactured and the CNC blade can create the channel in the cookware base.

The cookware can then be coated with a non-stick coating, or coated with other cosmetic and/or protection coatings to provide the finishing touch.

Using the mechanical process described above, a griddle plate can be easily manufactured. As described in U.S. patent application Ser. No. 12/246,459, a griddle plate having heat exchange channels can improve efficiency. For example, it is possible to make an energy efficient griddle by bonding a piece of thin stainless steel plate of 0.8 mm thick to a 15 mm thick aluminum plate. Then the heat exchange channels can be machined into the plate using the blade cutting process described above. A griddle plate created as such can be used as an add on accessory for a range top. It can also be implemented with a burner using a controlled circuit in a griddle appliance. A temperature sensor can be installed on the griddle plate to monitor the temperature and provide feedback to the control circuit to regulate the gas to the burner. In operation, the heat exchange channels in the plate enable rapid heating and uniform temperature distribution across the surface, thereby improving the energy efficiency.

FIG. 12 shows an example of a flowchart of a method for making a piece of energy efficient cookware. The method is organized as a sequence of modules in the flowchart 1200. However, it should be understood that these and modules associated with other processes and methods described herein may be reordered for parallel execution or into different sequences of modules.

In the example of FIG. 12, the flowchart 1200 starts at module 1202 with providing a piece of cookware having a wall and a thick base, the base including a heating surface and a cooking surface. The piece of cookware can be a stock pot, a wok, a frying pan, or any known or convenient piece of cookware. The wall and thick base can be created out of aluminum, stainless steel, copper, or any other known or convenient material. At times, it may be desirable to have a curved base.

In the example of FIG. 12, the flowchart 1200 continues to module 1204 with creating fins in the heating surface of the cookware base, the fins defining heat exchange channels operable to transfer thermal energy from a heat source to the cooking surface. Creating can mean cutting, casting, end milling, molding, machining, or otherwise forming the base into the shape of the fins. Having created fins in the heating surface the flowchart terminates.

Figure 13:
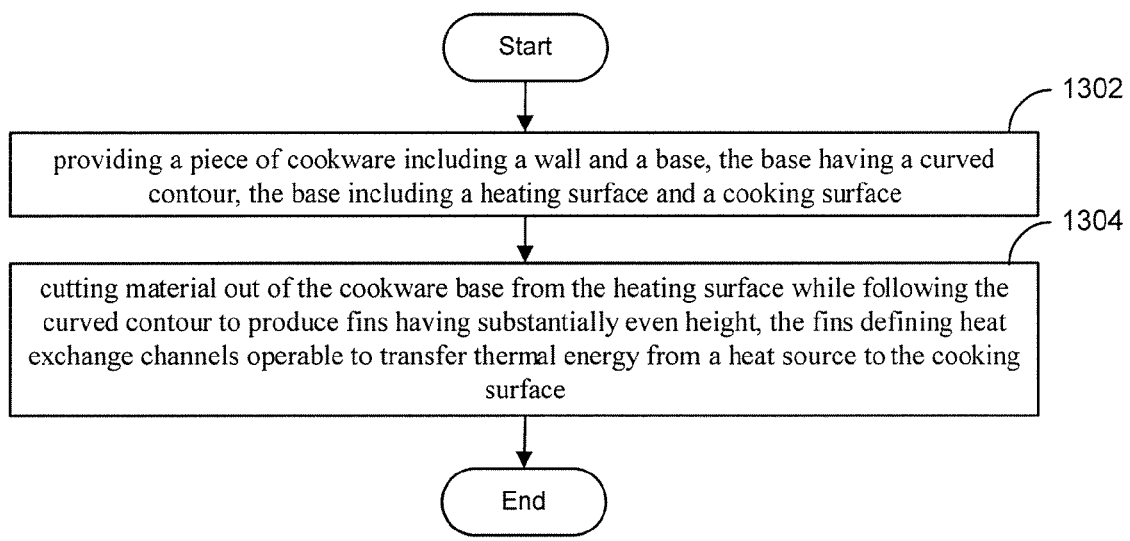
FIG. 13 shows an example of a flowchart of a method for making a piece of energy efficient cookware having a cookware base with a curved contour.

FIG. 13 shows an example of a flowchart of a method for making a piece of energy efficient cookware having a cookware base with a curved contour. The method is organized as a sequence of modules in the flowchart 1300. However, it should be understood that these and modules associated with other processes and methods described herein may be reordered for parallel execution or into different sequences of modules.

In the example of FIG. 13, the flowchart 1300 starts at 1302 with providing a piece of cookware including a wall and a base, the base having a curved contour, the base including a heating surface and a cooking surface. Exemplary pieces of cookware having curved bases are a wok and a kettle, but any other piece of cookware having a curved base may be used. For some pieces of cookware, such as a wok, the curved base may be continuous with the wall of the piece of cookware.

In the example of FIG. 13, the flowchart 1300 continues to module 1304 with cutting material out of the cookware base from the heating surface while following the curved contour to produce fins having substantially even height, the fins defining heat exchange channels operable to transfer thermal energy from a heat source to the cooking surface. Various apparatuses can be used to cut the base, for example, consider a rotary saw blade, a tapered blade, a band saw, a end milling cutter, or other cutting device. For blade based apparatuses, one or more blades can be used. Further, multiple blades can be used at the same time, such as in a gang blade assembly. Having cut material out of the cookware base the flowchart terminates.

Figure 14:
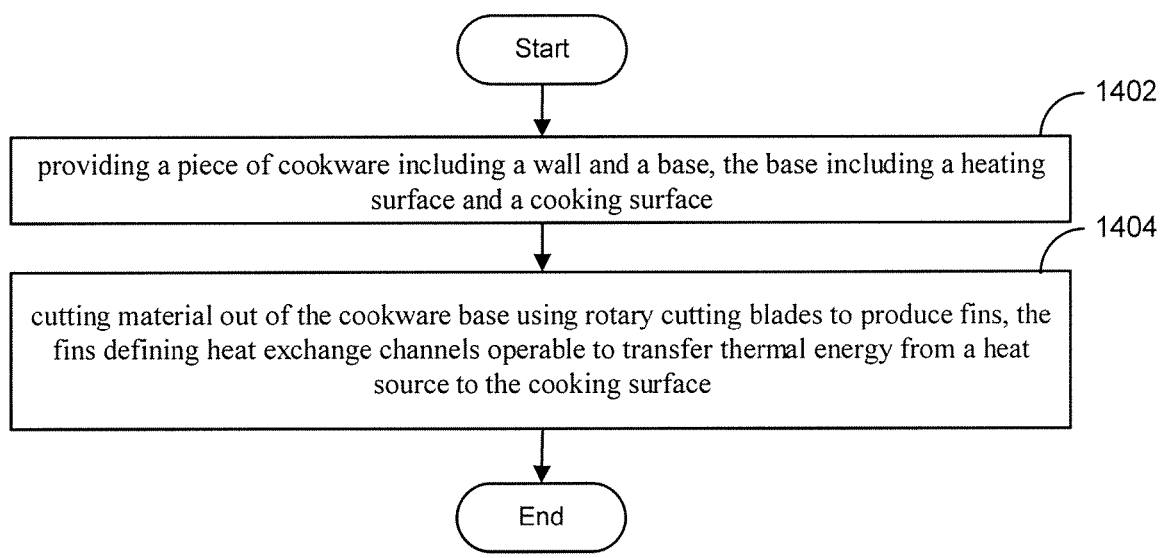
FIG. 14 shows an example of a flowchart of a method for making a piece of energy efficient cookware using a rotary cutting blade.

FIG. 14 shows an example of a flowchart of a method for making a piece of energy efficient cookware using a rotary cutting blade. The method is organized as a sequence of modules in the flowchart 1400. However, it should be understood that these and modules associated with other processes and methods described herein may be reordered for parallel execution or into different sequences of modules.

In the example of FIG. 14, the flowchart 1400 starts at 1402 with providing a piece of cookware including a wall and a base, the base including a heating surface and a cooking surface. The piece of cookware can have a base that is either soft, e.g. aluminum or hard, e.g. stainless steel, but typically, the base is thick enough to allow for material to be cut out while leaving fins. The resulting fins can be of height sufficient to create substantial heat exchange channels. Such fins are capable of absorbing thermal to increase the amount of thermal energy transferred to the cooking surface.

In the example of FIG. 14, the flowchart 1400 continues to module 1404 with cutting material out of the cookware base using rotary cutting blades to produce fins, the fins defining heat exchange channels operable to transfer thermal energy from a heat source to the cooking surface. Various devices can be used such a casting device, an end milling cutter, a molding device, a rolling bonder, a lathe, or another device for forming the base into the shape of the fins. Having cut material out of the cookware base, the flowchart terminates.

It will be appreciated to those skilled in the art that the preceding examples and are exemplary and not limiting. It is intended that all permutations, enhancements, equivalents, and improvements thereto that are apparent to those skilled in the art upon a reading of the specification and a study of the drawings are included within the true spirit and scope of the present disclosure. It is therefore intended that the following appended claims include all such modifications, permutations and equivalents as fall within the true spirit and scope of the present disclosure.

What is claimed is:

1. A method of making a piece of energy efficient cookware comprising:
   providing the cookware, wherein the cookware has a wall and a base, and wherein the base includes a heating surface and a cooking surface;

thickening the cookware base with a plate, wherein the plate is attached to the heating surface of the cookware base; and cutting a pattern of pairs of substantially parallel fins in the thickened cookware base, each pair of substantially parallel fins defines a respective heat exchange channel of a plurality of heat exchange channels operable to transfer thermal energy from a heat source to the cooking surface.

2. The method of claim 1, wherein the cookware is a stainless steel or aluminum wok,
wherein the base has a curved contour,
wherein the plate used to thicken the base has a curved contour substantially conforming to the curved contour of base, and
wherein the plate has a thickness of at least 8 mm and a radius substantially the same as a radius of the heating surface of the base.

3. The method of claim 1, wherein the cookware is stainless steel and the plate is aluminum.

4. The method of claim 1, wherein the plate is attached by impact bonding.

5. The method of claim 1, wherein welding or brazing is used to attach the plate to the heating surface to thicken the cookware base.

6. The method of claim 1, wherein one or more rotary blades is used to cut the pattern of substantially parallel fins in the thickened base.

7. The method of claim 1, wherein an end mill blade is used to cut the pattern of substantially parallel fins in the thickened base.

8. The method of claim 1, further comprising cutting slots into the heat exchange channels to facilitate flow of thermal energy throughout the heat exchange channels.

9. The method of claim 1, wherein a ridge shaped roller is used to cut the pattern of pairs of substantially parallel fins in the thickened base.

10. The method of claim 1, wherein the cookware is formed by,
deep drawing a piece of stainless steel to form the wall;
impact bonding the plate to the heating surface to form the thickened cookware base; and
cutting the heat exchange channels in the thickened base by the use of at least two rotary blades.

11. The method of claim 10, wherein the cookware is formed by,
cutting the heat exchange channels in the thick base to a depth of at least 7 mm such that the depth of each channel is equal to or greater than the spacing between each channel, wherein the at least two rotary blades have a spacing between blades of at least 5 mm;
rounding an edge of each fin to decrease an impedance of a flame entering the channels; and
attaching a handle to the wall at a position substantially away from an exit of the channels.

12. The method of claim 1, further comprising forming the plate as a composite plate of two or more pieces of metal.

13. The method of claim 12, wherein the composite plate is formed of two or more aluminum alloy plates.

14. A method of making a piece of energy efficient cookware comprising:
providing a cookware, wherein the cookware has a wall and a base, and wherein the base includes a heating surface and a cooking surface;
thickening the cookware base;
cutting a pattern of pairs of substantially parallel fins in the thickened cookware base, wherein each pair of substantially parallel fins defines a respective heat exchange channel of a plurality of heat exchange channels operable to transfer thermal energy from a heat source to the cooking surface.

15. The method of claim 14, wherein the cookware is a wok,
wherein the thickened cookware base has a curved contour,
wherein cutting the thickened cookware base along the length of the fins results in a channel of the heat exchange channels that has a channel depth greater than a channel width, and
wherein the cutting is performed using an end mill cutter.

16. The method of claim 14, wherein casting, drawing, or spinning is used to create the cookware.

17. The method of claim 14, wherein the cookware is aluminum or copper.

18. The method of claim 14, wherein the thickened cookware base is at least 4 mm thicker than a wall thickness.

19. The method of claim 14, wherein cutting the thickened cookware base results in a channel that has a channel depth greater than a channel width, and wherein the cutting is performed using an end mill cutter.

20. The method of claim 14, further comprising,
cutting the heat exchange channels in the thickened cookware base to a depth of at least 7 mm such that the depth of each channel is equal to or greater than the spacing between each channel;
rounding an edge of each fin to decrease an impedance of a flame entering the channels; and
attaching a long handle to the wall at a position over an exit of the channels,
wherein the cookware is made from aluminum, and
wherein the cutting is performed using at least two rotary blades having a spacing between blades of at least 5 mm.

21. The method of claim 14, wherein a ridge shaped roller is used to cut the pattern of pairs of substantially parallel fins in the thickened cookware base.

* * * * *